Dec. 14, 1965   J. DONIGER   3,223,362
FLIGHT CONTROL APPARATUS
Filed Aug. 21, 1963
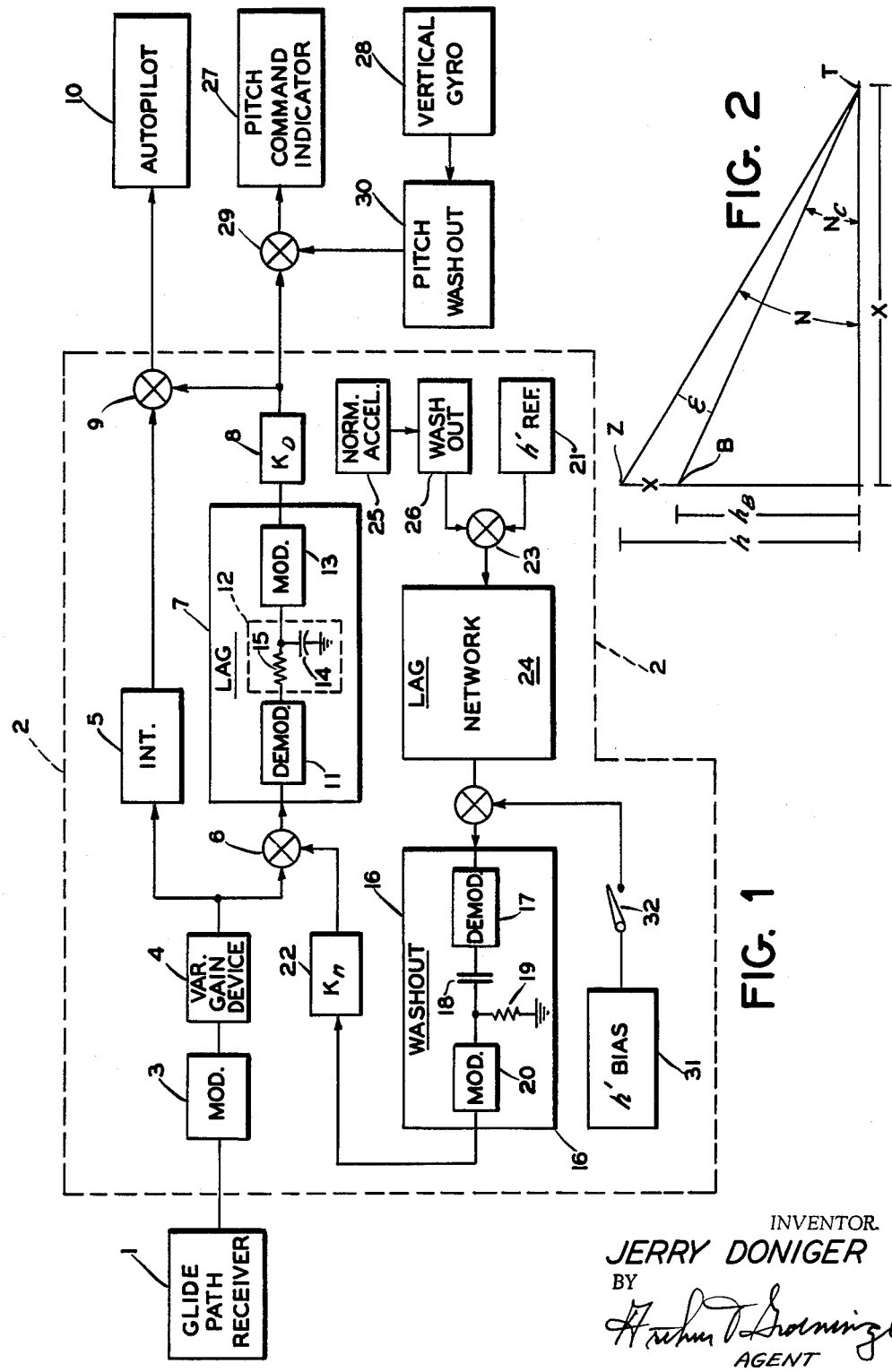
INVENTOR.
JERRY DONIGER
BY
AGENT United States Patent Office 3,223,362
Patented Dec. 14, 1965

3,223,362
FLIGHT CONTROL APPARATUS
Jerry Doniger, Montvale, N.J., assignor to The Bendix Corporation, Teterboro, N.J., a corporation of Delaware
Filed Aug. 21, 1963, Ser. No. 303,611
9 Claims. (Cl. 244—77)

The present invention relates to apparatus for guiding an aircraft onto a radio defined glide slope beam and more particularly, to apparatus for accurately guiding an aircraft on a radio beam at low altitudes when disturbances accompany the received radio defind displacement signal.

In conventional systems, a receiver is adapted to provide a signal representative of the magnitude and sense of the displacement of the aircraft with respect to the center line of a particular glide slope beam. This signal is not sufficient to cope with what is commonly referred to as long term error. Long term error is generally caused by wind or change in aircraft trim. It results from unbalance, in opposition to which an autopilot provides an equal counter force. While supplying the balancing force, and while the original unbalance force continues, the autopilot is incapable of correcting the error. As a result, a steady state tracking error exists.

To compensate for a long term tracking error, couplers in conventional systems are arranged to operate on the displacement signal so as to form a signal corresponding to the integral of the displacement signal. This integral term is added to the displacement signal to provide a pitch command signal. Any error condition is recognized by the integrator computer which builds up a control force equal and opposite to the unbalance force. When this counter force is built up by the integrator, the autopilot is enabled to correct the error condition in normal fashion.

The combination of the displacement signal and the integral signal provides an accurate pitch command signal to control the aircraft to the beam center down to an altitude of 200 feet. Since disturbances accompanying the received displacement signal increase appreciably during the latter portion of the approach descent below an altitude of 200 feet, due to terrain reflections, present approach couplers are limited to operations above this altitude.

In accordance with the present invention, a displacement signal is derived which is insensitive to disturbances at low altitude. The perturbing components of the radio defined displacement signal are of high frequency. In order to minimize the effects of these disturbances, the radio defined displacement signal is passed through an augmentation circuit which uses the radio defined displacement signal as a low frequency reference and a displacement rate signal as a high frequency reference. The displacement rate signal is derived independently of the radio defined displacement signal from a washed out rate of descent signal and has a much lower noise content than the radio defined displacement signal. This combination of signals when applied to a lag circuit provides a relatively noise-free displacement signal. The displacement signal is combined with a signal representing the integral of the radio defined displacement signal, as in conventional systems, to provide an accurate pitch command signal to an autopilot network down to altitudes of approximately 50 feet. Very little disturbance will accompany the integral of the displacement signal because integration results in smoothing. By this arrangement, it is no longer necessary to design equipment for the noisiest signals to be anticipated thereby penalizing the equipment when used for more perfect signals.

In order to minimize the effects of disturbances associated with the rate of descent signal due to turbulence and internal sensor noise, the rate of descent signal is passed through an augmentation circuit, which uses the rate of descent signal as a low frequency reference and a modified normal accelerometer signal as a high frequency reference. This combination of signal, when applied to a low pass filter, provides a relatively noise free rate of descent signal.

The present invention not only applies pitch command signals to an autopilot network but also applies signals to a pitch command indicator to visually indicate to the pilot the correct pitch attitude command. The pitch command to the flight director is similar to the autopilot command without the integration term. Adequate tracking accuracy is provided by a pitch washout circuit in the flight director computer.

An object of the present invention is to extend automatic approach of an aircraft along a radio defined path to very low altitudes.

Another object of the present invention is to provide a system capable of providing a disturbance free command signal to a flight indicator and to an autopilot network in response to a disturbance laden radio defined displacement signal.

Another object of the present invention is to provide means for developing a displacement signal having its low frequency components derived from a radio defined displacement signal and having its high frequency components derived from a modified rate of descent signal.

Another object of the invention is to reduce the amount of noise in the rate of descent signal by utilizing an augmentation circuit which uses a rate of descent signal as a low frequency reference and a modified normal accelerometer signal as a high frequency reference.

Another object of the present invention is to provide a rate of descent bias signal which operates as a tip-over command to improve initial capture performance.

Another object of the present invention is to desensitize the radio defined displacement signal in order to maintain stability at low altitudes and also to maintain the correct proportionality between the radio defined displacement signal and the displacement rate signal.

Another object of the present invention is to provide a system less sensitive to beam convergence than a standard approach coupler using displacement and integral terms to form the pitch command signal.

Another object of the present invention is to utilize components available in standard autopilot/coupler systems so that modifications to use this invention are minimized.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawings:
FIGURE 1 is a functional schematic diagram of the device of this invention.
FIGURE 2 illustrates characteristics of the descent path glide slope.

Referring to FIGURE 1, conventional equipment used for instrument landing is shown as glide path receiver 1 for receiving a vertical guidance signal from a glide path transmitter (not shown). In a conventional manner, the receiver 1 is connected with modulator 3 for developing an A.C. signal output, in accordance with a D.C. input which corresponds in magnitude and sense to the extent and direction of angular displacement of the craft from a respective beam.

The output signal for modulator 3 is fed through a variable gain device 4. The gain can be varied by conventional means which may be responsive to time, altitude, velocity, or other variables of the craft so as to compensate for an angular displacement signal representing smaller and smaller vertical steering error as the transmitter is approached. A typical variable gain device is shown and described in U.S. Patent No. 2,886,760, issued May 12, 1959, to P. A. Noxon et al., and assigned to the same assignee as the present invention.

The signal from variable gain device 4 is fed to both an integrator 5 and summation device 6. A typical integrator is shown in U.S. Patent No. 3,002,713 issued October 18, 1961 to P. A. Noxon et al., and assigned to the same assignee as the present invention. The output signal of the integrator is directly proportional to the time integral of the input voltage signal. The output signal from integrator 5 compensates for long-term error. Since integration results in smoothing the input radio defined displacement signal, disturbances accompanying the radio defined displacement signal are attenuated.

In order to compensate for short term error, the lower frequency components of the displacement signal are derived from the radio defined displacement signal and the higher frequency components of the displacement signal are derived from a displacement rate signal. The radio defined displacement signal is applied to lag network 7 by summation device 6. The lag network 7 filters out the high frequency components of the radio defined displacement signal and thereby rejects the high frequency noise components associated therewith. The high frequency components of the displacement signal are derived by integrating a displacement rate signal. A displacement rate signal derived from amplifier 22 is applied by summation device 6 to the lag circuit 7 which integrates the displacement rate signal. As described further on in the specification, the displacement rate signal has very little noise associated therewith as it is derived independently of the radio defined displacement signal from a relatively noise free washed out rate of descent signal. Since noise components of both the displacement rate signal and the radio defined displacement signal have been attenuated, the displacement signal derived from a combination of these signals is relatively noise free.

The effect of the displacement rate signal and the operation of the lag network 7 will now be described in terms of mathematical notation. The displacement rate signal as applied to summation device 6 from amplifier 22 may be represented as $\epsilon S\tau$ where $\epsilon$=beam displacement signal equal to the radio defined displacement signal but derived from a rate of descent signal,
S=Laplace operator or $d/dt$
$\tau$=constant The lag network 7 is adapted to modify the output from summation device 6 by the quantity $$\frac{1}{\tau S+1}$$

The output from summation device 6 is $\epsilon$ (the radio defined displacement signal) $+\epsilon S\tau$ (the displacement rate signal). Thus, the output from lag network 7, $\epsilon_0$, may be expressed as (1) $$\epsilon_0 = \frac{\epsilon + \epsilon S\tau}{\tau S+1}$$

(2) $$\epsilon_0 = \epsilon\left(\frac{\tau S+1}{\tau S+1}\right)$$

(3) $$\epsilon_0 = \epsilon$$

The output of the lag circuit 7 is applied by amplifier 8 to summation device 9. Summation device 9 also has an input adapted to receive the output of integrator 5. This combination of signals provides an accurate pitch command signal to autopilot network 10 down to an altitude of 50 feet.

The lag network 7 comprises a demodulator 11, an RC delay network 12 and a modulator 13. The demodulator 11 provides a direct voltage corresponding in polarity and amplitude to the phase and amplitude of the input signal. The output of demodulator is connected through RC filter circuit 12 to the input of modulator 13. The RC circuit includes capacitor 14 which has one terminal connected to resistor 15 and its opposite terminal connected to ground. A time constant of 5–10 seconds is chosen to provide a reasonable measure of beam noise rejection and the least dependence on the displacement rate signal.

Referring to FIGURE 2, the displacement rate signal $\epsilon S\tau$ will now be developed in terms of mathematical notation as follows:

(4) $$\epsilon = n - n_c$$

where:
$\epsilon$=beam displacement
$n$=angle of elevation of the aircraft formed by the runway and by a line TZ drawn from the ground transmitter to the aircraft.
$n_c$=angle of elevation of the glide slope beam TB with respect to the runway.

(5) $$\tan n = \frac{h}{x}$$

$$\tan n_c = \frac{h_B}{x}$$

where $h$ is the height of the aircraft and $h_B$ is the height of the beam at slant range $x$.

(6) $$n = \frac{h}{x}; \; n_c = \frac{h_B}{x}$$

because $n$ and $n_c$ are very small angles, approx. 2½°, and therefore, their values in terms of radians are very close to tangent values.

(7) substituting (6) in (4)

$$\epsilon = \frac{h}{x} - \frac{h_B}{x} = \frac{h - h_B}{x}$$

(8) But, $$h - h_B = \int_0^T \dot{h}\,dt - \int_0^T \dot{h}_B\,dt + \Delta h_0$$

where:

$\dot{h} = \dfrac{dh}{dt}$ = actual rate of descent $\dot{h}_B = \dfrac{dh_B}{dt}$ = rate of descent when on beam $\Delta h_0$ = initial displacement from the beam (9) Then $$\epsilon = \frac{1}{x}\left[\int_0^T \dot{h}\,dt - \int_0^T \dot{h}_B\,dt + \Delta h_0\right]$$

In developing a signal based on the above equation, $x$ may be assigned a constant value and $\Delta h_0$ may be ignored. Although $x$ continually varies in value, a constant value equal to the average value of $x$ may be accurately arrived at. $\Delta h_0$, the initial displacement from the beam, is a constant and will be accounted for by the integral of the displacement signal.

(10) $$\epsilon = \frac{1}{x}\int_0^T (\dot{h} - \dot{h}_B)\,dt$$

The above equation requires that a bias signal, equal to the rate of descent when on beam, $\dot{h}_B$, be inserted to cancel the actual rate of descent, $\dot{h}$. If a value was assumed for $\dot{h}_B$, it would have to correspond with the actual rate of descent of the aircraft when on beam in order to avoid steady state beam errors. To accurately assume such a value, the airplane velocity and the actual glide slope angle must be known in advance. In order to obviate this impractical requirement, the present invention carries out this cancellation function by passing the $\dot{h}$ signal through a washout circuit 16.

Referring to FIGURE 1, the washout circuit 16 has a rate of descent signal applied thereto which is converted to D.C. by demodulator 17. Demodulator 17 may be any conventional phase sensitive demodulator operating with a reference alternating voltage which is in phase with the rate of descent excitation voltage. The D.C. signal from demodulator 17 is applied to washout circuitry comprising capacitor 18 and resistor 19. The washout circuitry is designed to have a time constant of approximately 20 seconds. The D.C. signal from demodulator 17 causes the capacitor to charge. The increasing charge on the capacitor 18 offers an increasing opposition to the applied input rate of descent signal and causes the current to decrease. After an interval of time, the capacitor is fully charged and average current flow stops completely. Perturbations about the average are allowed to pass. A modulator 20 is connected to the washout circuitry and modulates the washed out, direct current rate of descent signal upon an alternating current carrier.

It will now be apparent that the overall washout circuitry above described constitutes a system in which the rate of descent signal communicated to demodulator 17 operates the washout circuitry until its output is zero. For a steady state of the system therefore, i.e. where the rate of descent signal is of a given constant amplitude, the output signal from the washout will be zero. Only when the magnitude of $\dot{h}$ is changed will the washout have an output and this output will be equal to this change. The total output of the washout, as $\dot{h}$ is driven to its steady state value, $\dot{h}_\mathrm{B}$, is the sum of all the changes in $\dot{h}$. The output of the washout when the steady state value, $\dot{h}_\mathrm{B}$, is reached will be zero. The total output of the washout, therefore, is equal to the difference between the actual rate of descent, $\dot{h}$, and the rate of descent, $\dot{h}_\mathrm{B}$, when on beam.

The transform function for the washout circuit is $$\frac{\tau S}{\tau S + 1}$$

Thus,

(11) $\quad \int_0^T (\dot{h} - \dot{h}_\mathrm{B}) dt = \int_0^T \dot{h} dt \left[\frac{\tau S}{\tau S+1}\right] = \frac{1}{S}\left[\frac{\tau S}{\tau S+1}\right]\dot{h}$ where $s$ = Laplace operator.

Substituting this value into equation 10 aforenoted, we obtain

(12) $\quad \epsilon = \frac{\tau}{xS}\left[\frac{\tau S}{\tau S+1}\right]\dot{h}$

(13) $\quad \tau \epsilon = \frac{\tau}{xS}\left[\frac{\tau S}{\tau S+1}\right]\dot{h}$ By assuming a constant value of slant range $x$, a gain $$K_\mathrm{h} = \frac{\tau}{x}$$

may be chosen. Thus,

(14) $\quad \tau \epsilon = \frac{K_\mathrm{h}}{S}\left[\frac{\tau S}{\tau S+1}\right]\dot{h}$

(15) $\quad \tau \epsilon S = K_\mathrm{h}\left[\frac{\tau S}{\tau S+1}\right]\dot{h}$ The manner in which the displacement rate signal $\tau \epsilon S$ is developed will now be described. A conventional rate of descent responsive device 21 such as the barometric device described in U.S. Patent No. 2,953,328, is used to produce a rate of descent signal ($\dot{h}$). Although not necessary, the $\dot{h}$ signal is passed through an augmentation circuit comprising components 23, 24, 25, and 26 in order to minimize the disturbances associated with it due to turbulence and internal sensor noise. The details of this augmentation circuit will be described further on in the specification. The rate of descent signal is passed through washout 16 which modifies the signal by the quantity $$\frac{\tau S}{\tau S+1} \text{ to form } \dot{h}\left[\frac{\tau S}{\tau S+1}\right]$$

This signal is then fed through amplifier 22 having a gain, $K_\mathrm{h}$.

As developed in Equation 15 aforenoted, $$K_\mathrm{h}\left[\frac{\tau S}{\tau S+1}\right]\dot{h}$$

is equal to the required displacement rate signal, $S\epsilon\tau$.

In order to minimize the effects of $\dot{h}$ noise, the $\dot{h}$ signal is passed through an augmentation circuit which uses the rate of descent signal as a low frequency reference and a modified normal accelerometer signal as a high frequency reference. This combination of signals when applied to low pass filter provides a noise free instantaneous altitude rate signal $\dot{h}_\mathrm{A}$.

The augmentation circuit includes a summing device 23 which has applied thereto an acceleration signal $\tau A_\mathrm{N}$ (where $\tau$=acceleration gain) and a rate of descent rate signal, $\dot{h}$. The output of the summing device is fed to lag network 24, identical to lag network 7, previously described, except that it has a time constant of 4 seconds which is chosen as a compromise between the high values needed to filter the noise of the barometric rate of descent signal and the low values needed to minimize the dependence on the accelerometer as a long-term reference signal. The lag network 24 modifies the summation by the quantity $$\frac{1}{\tau S+1}$$

The output $\dot{h}_\mathrm{A}$ of the lag network 24 can be expressed as

(16) $\quad \dot{h}_\mathrm{a} = \frac{\dot{h}_\mathrm{B}}{\tau S+1} + \frac{\tau A_\mathrm{N}}{\tau S+1}$

(17) $\quad \dot{h}_\mathrm{a} = \frac{1}{\tau S+1}(\dot{h}_\mathrm{B} + \tau \ddot{h})$ To the extent that the noise on $\dot{h}_\mathrm{B}$ is concentrated at a frequency above $1/T$, rad/sec, $\dot{h}_\mathrm{A}$ will be relatively noise free. Since the noise associated with $\dot{h}_\mathrm{B}$ has been attenuated we can say $\dot{h}_\mathrm{B} = \dot{h}$ exactly, then substituting $S\dot{h}$ for $A_\mathrm{n}$

(18) $\quad \dot{h}_\mathrm{A} = \frac{1}{\tau S+1}(\dot{h} + \tau S\dot{h})$

(19) $\quad \dot{h}_\mathrm{A} = \frac{\dot{h}}{\tau S+1}(\tau S+1)$

(20) $\quad \dot{h}_\mathrm{A} = \dot{h}$

A conventional normal accelerometer device 25 such as that described in Patent No. 3,008,078 may be used to produce a normal acceleration signal. This signal should be compensated for steady state errors due to mounting misalignment of the accelerometer, angle of attack of the aircraft and varying flight patterns of the aircraft. Thus, the angles of misalignment, attack, and flight pattern must be known in advance in order to accurately arrive at normal acceleration.

In order to avoid this impractical requirement, the acceleration signal is passed through a high pass filter or "washout" 26. This washout 26 has a time constant of 20 seconds but is otherwise identical to washout 16. The washout will compensate for steady state errors by driving their input to zero. The washout 26 output will only be responsive to changes in the normal acceleration signal. These changes are due to wind gusts. It is these same wind gusts which are responsible for the aircraft having any acceleration at all. Thus, the output of the washout 26 will substantially concur with the actual normal acceleration of the aircraft.

The present invention includes means 31 for developing a bias signal corresponding to the rate of descent of the aircraft. This bias signal is adapted to be fed via switch 32 to the circuitry of coupler 2 so as to assist initial capture of the glide slope beam with relatively little overshoot. This signal is rendered effective to provide most of the required pitch down bias upon the aircraft reaching a predetermined position with respect to the center line of the glide slope beam, e.g. when the aircraft intercepts the center line, and maintains the error signal effective for a predetermined time interval thereafter. Any conventional means for arriving at the rate of descent, such as the barometric device described in U.S. Patent No. 2,952,328, may be utilized. Likewise, conventional switching device may be utilized for selectively connecting the $\dot{h}$ bias signal to the autopilot network.

The system thus described is adapted to provide a pitch command signal to an autopilot network 10 which actuates the craft's control surface so as to cause the craft to capture a beam center. The system of the present invention is also adapted to supply a conventional pitch command indicator 27 with a signal in response to which the pitch command indicator 27 gives a pilot a visual indication of the correct pitch attitude command.

The pitch command to the pitch command indicator 27 is similar to the autopilot command without the integration term. Adequate tracking accuracy is provided by a washed out pitch signal derived from a conventional vertical gyroscope 28 and washout 30. Washout 30 is identical to washout circuitry 16 hereinbefore described having a relatively long time constant of 20–30 seconds.

When the aircraft is flying off the glide slope beam, a displacement signal from amplifier 8 is fed through summation device 29 for positioning a horizontal steering bar of the pitch command indicator 27 away from its zero position. The pilot in response to observing a non-zero position of the horizontal steering bar operates the aircraft controls for pitching the aircraft toward the glide slope beam. If the pitch command indicator was responsive only to the displacement signal, the pilot would operate the aircraft controls so that the aircraft would assume a pitch attitude which would cause the aircraft to assume a pitch attitude resulting in overshoot of the glide slope beam. To compensate for this, a vertical gyro 28 develops a signal in response to a change in pitch which is applied to summation device 29 in opposition to the displacement signal causing the indicator to approach a zero reading with the result that the pilot operates the aircraft controls so that the aircraft gradually approaches the glide slope beam without overshoot. The signal developed by vertical gyro 28 is applied to summation device 29 by washout circuitry 30. Washout 30 cancels out undesirable sustained signals from vertical gyro 28. These sustained signals may result, e.g. from a particular trim pitch attitude assumed by the aircraft to fly beam center under various winds or from a mounting misalignment of the vertical gyro.

*Operation*

Glide path receiver 1 picks up a displacement signal representative of the magnitude and sense of displacement of the aircraft with respect to a glide slope beam. This signal is applied to coupling unit 2 by modulator 3 and variable gain device 4. The variable gain device 4 compensates for an angular displacement signal representing smaller and smaller steering error as the transmitter is approached. Coupling unit 2 operates on the radio defined displacement signal so as to provide a relatively noise free pitch command signal to an autopilot network 10 and flight indicator 27.

Coupling unit 2 develops the autopilot signal in the following manner. The radio defined displacement signal is fed to integrator 5 to develop a signal corresponding to the integral of the radio defined displacement signal. This integral term compensates for long-term error. In order to compensate for short-term error, the radio defined displacement signal is combined at summation device 6 with a displacement rate signal derived from a washed out rate of descent signal independent of the radio defined displacement signal. This combination of signals when applied to lag network 7 produces a disturbance free displacement signal, which is added to the integral term at summation device 9 to provide a pitch command signal to the autopilot network so as to accurately track beam center down to an altitude as low as 50 feet.

The signal applied to the pitch command indicator 27 is developed in the same manner as the pitch command signal to the autopilot, except for the integral terms. Adequate tracking accuracy is provided by applying a washed out pitch attitude signal to the flight indicator 27. A pilot, in response to observing a non-zero position of the horizontal steering bar of the pitch command indicator 27 operates the aircraft controls for pitching the aircraft toward the glide slope beam. In response to a change in pitch, vertical gyro 28 develops a signal which is applied in opposition to the displacement signal causing the indicator to approach a zero reading with the result that the pilot operates the aircraft controls so that the aircraft gradually approaches the glide slope beam without overshoot. Washout 30 cancels out undesirable sustained signals from vertical gyro 28 when the aircraft is flying on the center of the glide slope beam.

The signals as developed by the system of the present invention will provide adequate pitch command down to an altitude of approximately 50 feet as compared to a 200 foot limitation in most conventional couplers.

Although only a single embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Apparatus for guiding an aircraft onto a selected path, said apparatus comprising receiver means for providing a radio defined displacement signal, instrument means independent of said receiver means for providing a relatively disturbance free displacement rate signal, and signal generating means utilizing said radio defined displacement signal as a low frequency reference and said displacement rate signal as a high frequency reference for providing a relatively disturbance free displacement signal corresponding to the angular displacement of said aircraft from said selected path.

2. Apparatus as defined by claim 1 in which said instrument means includes second signal generating means responsive to the rate of descent of said aircraft for developing a disturbance free rate of descent signal, and washout circuit means responsive to said rate of descent signal for developing a signal proportional to the rate of change of said displacement signal.

3. Apparatus as defined by claim 2 in which said second signal generating means includes third signal generating means responsive to normal acceleration of said aircraft, fourth signal generator means responsive to rate of descent of said aircraft, means for summing said acceleration signal and rate of descent signal, a lag network, the output of the summing means being applied to said lag network to thereby produce an instantaneous rate of descent signal free of turbulence and internal sensor disturbance associated with the first mentioned rate of descent signal.

4. Apparatus for guiding an aircraft onto a selected path defined by a radio beam and maintaining the aircraft on said path in an area of appreciable disturbances, comprising receiver means for providing a radio defined displacement signal proportional to said aircraft's displacement from said selected path, signal generator means independent of said receiver means for developing a rate signal corresponding to the rate of change of said displacement signal, means for summing said displacement signal and said rate signal, and lag circuit means responsive to the output of said summing means for producing a displacement signal free of disturbances associated with said radio defined displacement signal.

5. Apparatus for guiding an aircraft onto a selected course defined by a radio beam and maintaining the aircraft on said course in an area of appreciable disturbances, said apparatus comprising receiver means for providing a radio defined displacement signal proportional to said aircraft's displacement from said selected course, signal generating means responsive to the rate of descent of said aircraft, a washout circuit, means for reducing disturbances associated with said rate of descent signal, means for applying said disturbance free rate of descent signal to said washout circuit, and lag circuit means responsive to said radio defined displacement signal and said washed out rate of descent signal for developing a displacement signal free of disturbance associated with said radio defined displacement signal.

6. Apparatus for guiding an aircraft onto a selected path, comprising receiver means for providing a radio defined displacement signal, signal generator means independent of said receiver means for developing a rate signal corresponding to the rate of change of said displacement signal, means for summing said displacement signal and said rate signal, lag circuit means responsive to the output of said summing means for producing a displacement signal free of disturbances associated with said radio defined displacement signal, means for providing a signal corresponding to the pitch of said aircraft, means for washing out said pitch signal, means responsive to said washed out pitch signal and said disturbance free displacement signal to provide the pilot with a visual indication of the extent to which he should operate the aircraft controls whereby said aircraft may be guided on said selected path down to a relatively low altitude.

7. A flight path control apparatus for an instrument landing system of an aircraft for guiding an aircraft on a radio defined glide slope beam in an area of appreciable disturbances, said apparatus comprising power means for operating a control surface of the aircraft, receiver means for providing a radio defined displacement signal proportional to said aircraft's displacement from said glide slope beam, signal generator means independent of said receiver means for developing a rate signal corresponding to the rate of change of said displacement signal, means for summing said displacement signal and said rate signal, lag circuit means responsive to the output of said summing means for producing a properly phased displacement signal free of disturbances associated with said radio defined displacement signal, means responsive to said radio defined displacement signal for providing a signal corresponding to the integral of said radio deviation signal, means responsive to said integral signal and said properly phased displacement signal to provide a pitch command signal to said power means to actuate said control surfaces whereby said aircraft may be guided on said glide slope beam down to a relatively low altitude.

8. A flight path control apparatus for an instrument landing system of an aircraft for guiding an aircraft on a radio defined glide slope beam down to a relatively low altitude in an area of appreciable disturbances, said apparatus comprising power means for operating control surfaces of the aircraft, receiver means for providing a radio defined first displacement signal proportional to said aircraft's displacement from said glide slope beam, signal generator means independent of said receiver means for developing a rate signal corresponding to the rate of change of said displacement signal, means for summing said displacement signal and said rate signal, lag circuit means responsive to the output of said summing means for producing a properly phased second displacement signal free of disturbances associated with said radio defined displacement signal, means responsive to said radio defined displacement signal for providing a signal corresponding to the integral of said radio defined displacement signal, means responsive to said integral signal and said second displacement signal to provide a pitch command signal to said power means to actuate said control surfaces whereby said aircraft may be guided on said glide slope beam down to a relatively low altitude in an area of appreciable disturbances, and means for supplying a bias signal to said pitch command signal during the initial capture phase of said glide slope beam thereby preventing overshoot of said glide slope beam.

9. Apparatus for guiding an aircraft onto a selected path, said aircraft comprising receiver means for providing a radio defined displacement signal, instrument means independent of said receiver means for providing a relatively disturbance free reference signal proportional to the rate of change of said displacement signal, means utilizing said radio defined displacement signal as a low frequency reference and said reference signal as a high frequency reference for providing a relatively disturbance free displacement signal proportional to the displacement of said aircraft from said selected path.

References Cited by the Examiner

UNITED STATES PATENTS

| | | | |
|---|---|---|---|
| 2,670,454 | 2/1954 | Wilson | 244—77 |
| 3,031,662 | 4/1962 | Bond | 244—77 |
| 3,058,699 | 10/1962 | Osder | 244—77 |
| 3,077,557 | 2/1963 | Joline | 244—77 |

MILTON BUCHLER, *Primary Examiner.*

RALPH D. BLAKESLEE, FERGUS S. MIDDLETON,
*Examiners.*